United States Patent
Browne et al.

(10) Patent No.: US 6,910,714 B2
(45) Date of Patent: Jun. 28, 2005

(54) ENERGY ABSORBING ASSEMBLY AND METHODS FOR OPERATING THE SAME

(75) Inventors: Alan Lampe Browne, Grosse Pointe, MI (US); Nancy L. Johnson, Northville, MI (US)

(73) Assignee: General Motors Corporation, Detroit, MI (US)

(*) Notice: Subject to any disclaimer, the term of this patent is extended or adjusted under 35 U.S.C. 154(b) by 190 days.

(21) Appl. No.: 10/405,969

(22) Filed: Apr. 2, 2003

(65) Prior Publication Data

US 2004/0195815 A1 Oct. 7, 2004

(51) Int. Cl.⁷ .............................................. B60R 21/04
(52) U.S. Cl. ............................... 280/753; 296/187.05
(58) Field of Search .............................. 280/751, 752, 280/753; 296/187.05; 267/139, 175

(56) References Cited

U.S. PATENT DOCUMENTS

| | | | |
|---|---|---|---|
| 5,098,124 A | 3/1992 | Breed et al. | 280/751 |
| 5,189,110 A | 2/1993 | Ikematu et al. | 525/314 |
| 5,662,294 A * | 9/1997 | Maclean et al. | 244/219 |
| 5,727,391 A | 3/1998 | Hayward et al. | 60/528 |
| 5,794,975 A | 8/1998 | Nohr et al. | 280/753 |
| 5,851,005 A | 12/1998 | Muller et al. | 256/13.1 |
| 6,170,871 B1 * | 1/2001 | Goestenkors et al. | 280/743.1 |
| 6,174,008 B1 | 1/2001 | Kramer et al. | 293/118 |
| 6,234,526 B1 | 5/2001 | Song et al. | 280/751 |
| 6,464,246 B2 | 10/2002 | Bayley | 280/728.1 |
| 6,659,631 B2 * | 12/2003 | Butera et al. | 362/513 |
| 6,786,508 B2 * | 9/2004 | Fraley et al. | 280/751 |
| 2001/0048215 A1 | 12/2001 | Breed et al. | |

FOREIGN PATENT DOCUMENTS

| | | |
|---|---|---|
| EP | 0 455 342 | 11/1991 |
| FR | 2718615 | 10/1995 |
| JP | 4-76274 | 3/1992 |
| JP | 05024494 | 2/1993 |
| JP | 7-42893 | 2/1995 |
| JP | 09059418 | 3/1997 |
| WO | 02/46258 | 7/2002 |

OTHER PUBLICATIONS

Qui et al. "A study on High speed Actuation of Shape Memory Alloy", SPIE vol. 4235, 2001.

* cited by examiner

*Primary Examiner*—David R. Dunn
(74) *Attorney, Agent, or Firm*—Kathryn A. Marra

(57) ABSTRACT

An energy absorbing assembly includes a covering; and a shape memory material in operative communication with the covering, wherein the shape memory material has a first shape attached to an underside of the covering and is operative to change to a second shape in response to an activation signal. The second shape of the shape memory material can cause the covering to expand or expand and detach from a surrounding surface medium. The energy absorbing assembly is used to absorb kinetic energy of an object impacting the assembly. Methods of operating the assembly are also disclosed.

27 Claims, 3 Drawing Sheets

ENERGY ABSORBING ASSEMBLY AND METHODS FOR OPERATING THE SAME

BACKGROUND

This disclosure relates to an energy absorbing assembly and more particularly, to an energy absorbing assembly adapted to provide increased energy adsorption in response to an activation signal.

Many products are vulnerable to injurious forces resulting from an impact, e.g., vehicles, helmets, and the like. These products must be able to absorb a significant percentage of the energy from an impact. Within the vehicle, for example, occupants require protection from an impact with structural body components such as door pillars, frames, and headrails. These components are typically made of steel tubing or steel channels that are welded together to form the structural cage or unitized body for the vehicle and may themselves become deformed as a result of the impact. Energy absorbers have been placed over the door pillars, frames, headrails, and other parts of the vehicle to protect the vehicle occupants. Prior art approaches have used irreversible air inflation devices, e.g. air bags and inflatable side curtains, rigid translation devices, e.g., extendable/retractable knee bolsters, and devices that can change the stroking forces, e.g., magnetorheological material based dampers.

BRIEF SUMMARY

Disclosed herein is an energy absorbing assembly comprising a covering; and a shape memory material in operative communication with the covering, wherein the shape memory material has a first shape attached to an underside of the covering and is operative to change to a second shape in response to an activation signal.

Also disclosed herein is an interior vehicle surface comprising an energy absorbing assembly comprising a covering and a shape memory material in operative communication with the covering, wherein the shape memory material has a first shape attached to an underside of the covering and is adapted to expand to a second shape in response to an activation signal, wherein the second shape has a greater length dimension than the first shape and causes the covering to expand and/or move.

A vehicle component comprises a support structure; and an energy absorbing assembly attached to the support structure, wherein the energy absorbing assembly comprises a shape memory material in operative communication with a covering, wherein the shape memory material has a first shape attached to an underside of the covering and is operative to change to a second shape in response to an activation signal and revert back to the first shape upon discontinuation of the activation signal.

A method of operating an energy absorbing assembly comprising attaching the energy absorbing assembly to a support structure, wherein the energy absorbing assembly comprises a cover and a shape memory material disposed between the support structure and the cover; sensing an impact of an object; providing an activation signal to the shape memory material to cause the cover to expand or expand and detach from a surrounding surface medium, wherein the covering and the expanded shape memory material are adapted to absorb a kinetic energy of the object; and discontinuing the activation signal to revert the shape memory material and cover back to an original position.

In another embodiment, a method of operating an energy absorbing assembly, comprising attaching the energy absorbing assembly to a support structure, wherein the energy absorbing assembly comprises a cover, a shape memory material disposed between the support structure and the cover, and an acutator; sensing an impact of an object; providing a first activation signal to the actuator and causing the shape memory material and cover to expand or expand and detach from the support structure, wherein the cover and the shape memory material are adapted to absorb a kinetic energy of the object; and providing a second activation signal to the shape memory material to cause the shape memory material and cover to return to its original position.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1A:
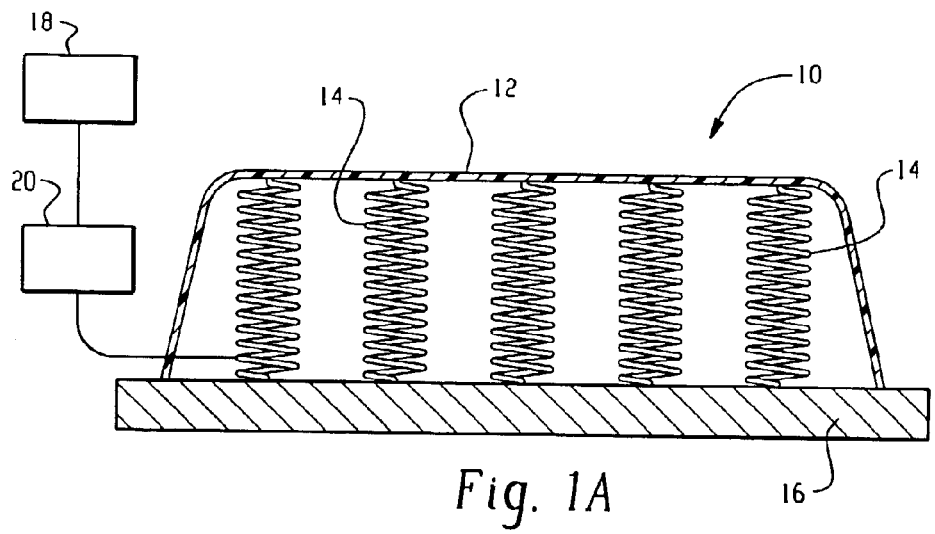
FIG. 1(a, b) are enlarged cross-sectional views of an energy absorbing assembly.
Figure 1B:
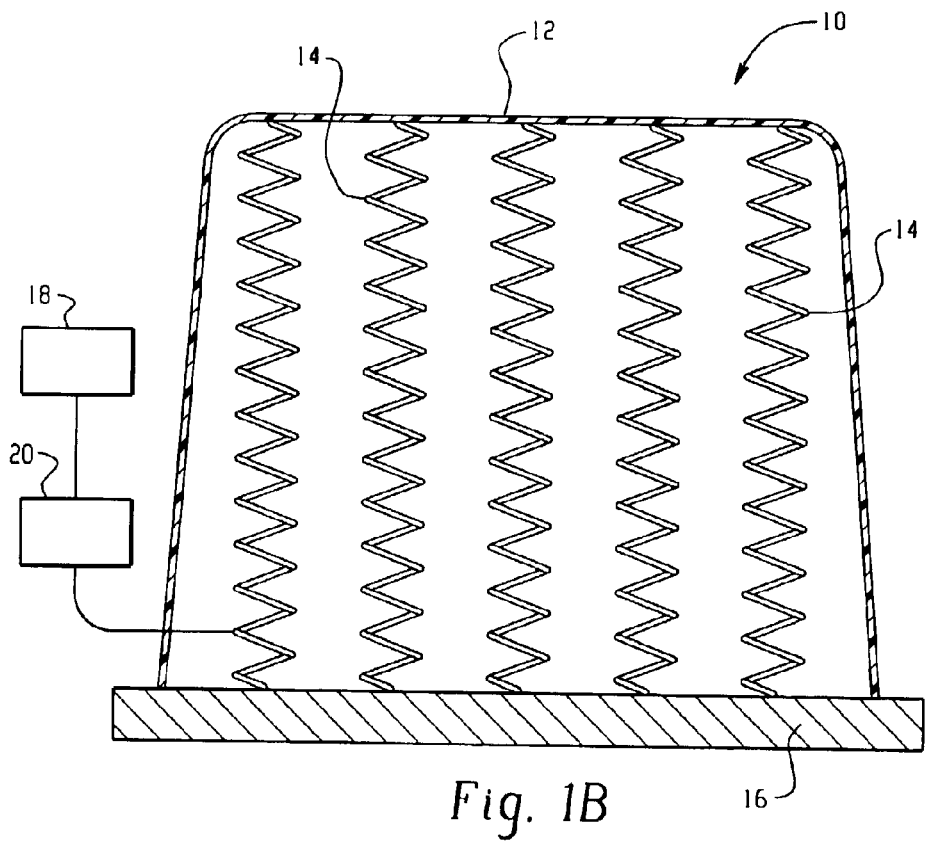

As shown in FIG. 1, an energy absorbing assembly, generally indicated as 10, comprises a covering 12 and a shape memory material 14 in operative communication with the covering 12. In one embodiment, the shape memory material 14 is adapted to change shape to effect a change in the length dimension of the shape memory material and cause the covering 12 to expand and/or detach in response to an activation signal. Preferably, upon discontinuation of the activation signal, the shape memory material 14 changes substantially back to its original shape (and original length dimension) and simultaneously contracts the covering substantially back to its original shape and/or original position. The activation signal provided for changing the shape orientation of the shape memory material 14 may include a heat signal, an electrical signal, a pneumatic signal, a mechanical activation signal, combinations comprising at least one of the foregoing signals, and the like; the particular activation signal depending on the materials and/or configuration of the shape memory material 14. Preferably, the shape memory material 14 thermally increases its length dimension in response to the activation signal to cause the covering 12 to expand and/or detach from its surrounding surface medium. The energy absorbing assembly 10, in its expanded form, can then be used to absorb the kinetic energy of an object upon impact therewith. The covering 12 and the shape memory material 14, individually as well as in combination, provide the energy absorbing properties for the energy absorbing assembly 10.

The energy absorbing assembly 10 is preferably affixed to a support structure 16. The support structure 16 can be stationary or non-stationary, or rigid, depending on the intended application. Of course, it is expected that greater energy dissipation will be achieved in the energy absorbing assembly 10 by attaching it to a stationary and rigid support.

Figure 2A:
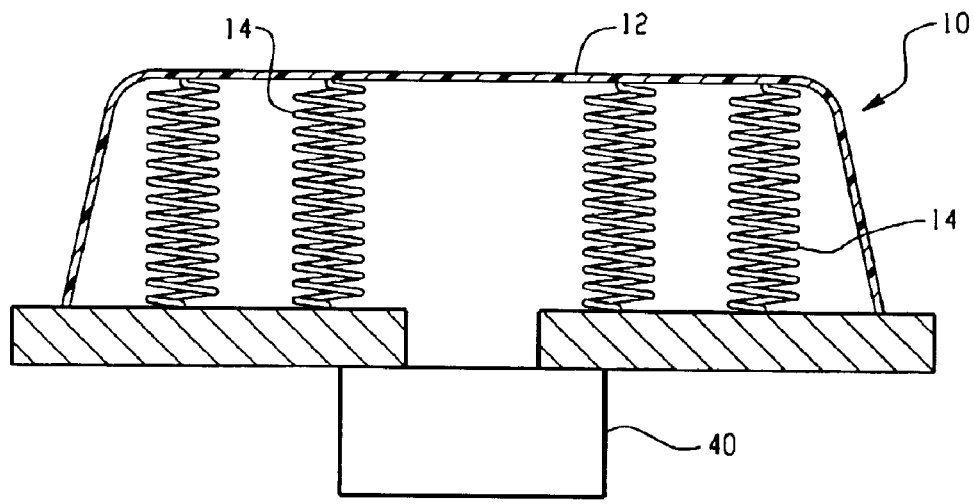
FIG. 2(a, b) are enlarged cross-sectional views of an energy absorbing assembly in accordance with another embodiment.
Figure 2B:
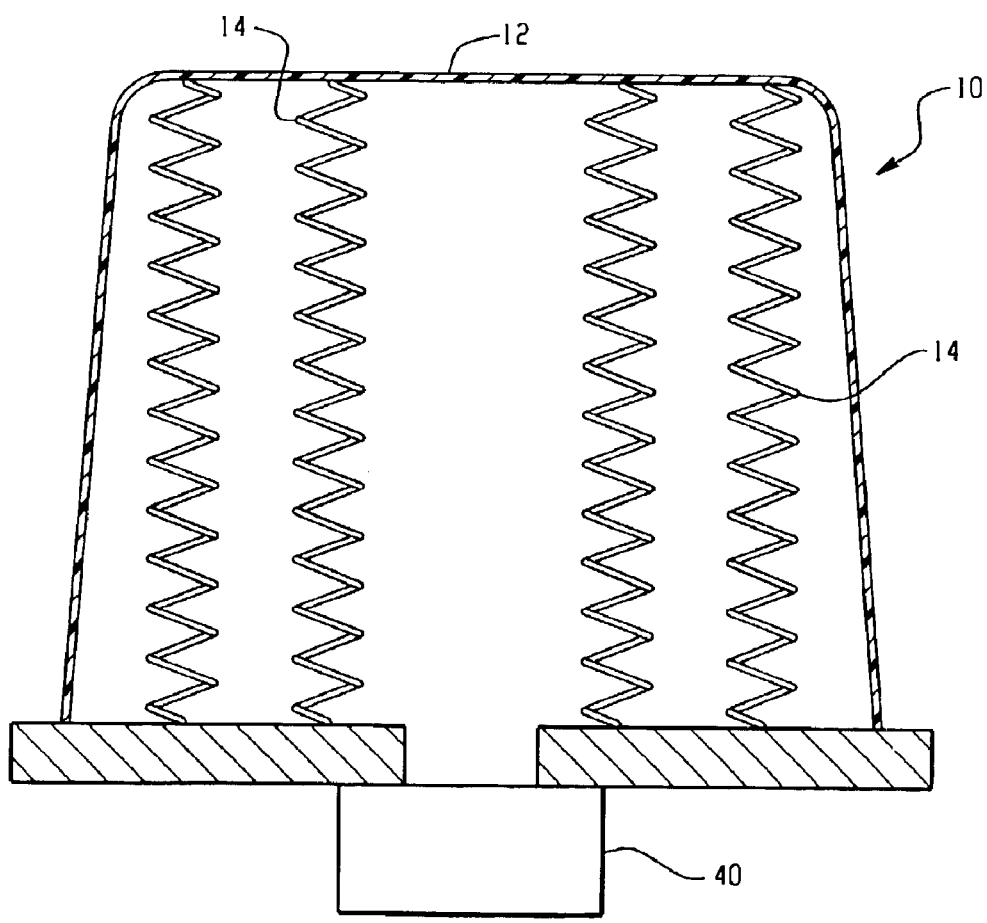

In another embodiment, the energy absorbing assembly 10 may further comprise a mechanical actuator as shown in FIG. 2. In such devices, the mechanical actuator 40 would be used to rapidly inflate (inflate within a time interval on the order of milliseconds or less) the covering 12 causing it to expand or detach from its surrounding surface medium, wherein upon receipt of an activation signal the shape memory material 14 would cause the energy absorbing assembly 10 to return to its original shape and/or original position. Restoration to the original shape and/or position would have no requirement for rapid action, and thus could effectively be managed through the action of the shape memory material over a time interval on the order of seconds.

The mechanical actuator 40 can be a pyrotechnic device, a piezoelectric device, and/or an accumulator device depending on the desired configuration. Upon detection of an event such as an impact, the mechanical actuator 40 would cause rapid expansion and/or detachment of the covering 12 from the surrounding surface medium and also cause the spring shaped shape memory material 14 to stretch. The stretching of the shape memory material 14 is a plastic deformation rather than an elastic deformation so that the "springs" would then be available to absorb kinetic energy associated with an object impacting the energy absorbing assembly 10. After the impact event, an activation signal can be delivered to the shape memory material 14 to cause the material 14 to revert to its original shape and/or position, thereby causing the covering to retract as well to its original position. For example, an activation signal such as heat may be applied to shape memory material that would cause the springs (and the covering) to return to their original geometry. Such a device may also be engineered to absorb impact energy variously through controlled venting (not shown) to the covering 12 and/or plastic compression of the shape memory material springs 14.

In another embodiment, the energy absorbing assembly 10 further comprises a sensor 18 and a controller 20 in operative communication with the shape memory material 14 for expanding (and/or detaching) the covering 12 in response to an activation signal provided by the sensor 18. The sensor 18 is preferably configured to provide pre-impact information to the controller 20, which then actuates the energy absorbing assembly 10 under pre-programmed conditions defined by an algorithm or the like. In this manner, the system 10 can be used to anticipate an event such as an impact with an object and provide absorption of the kinetic energy associated with the object as a result of the impact. The illustrated energy absorbing assembly 10 is exemplary only and is not intended to be limited to any particular shape, size, configuration, or the like.

Figure 3:
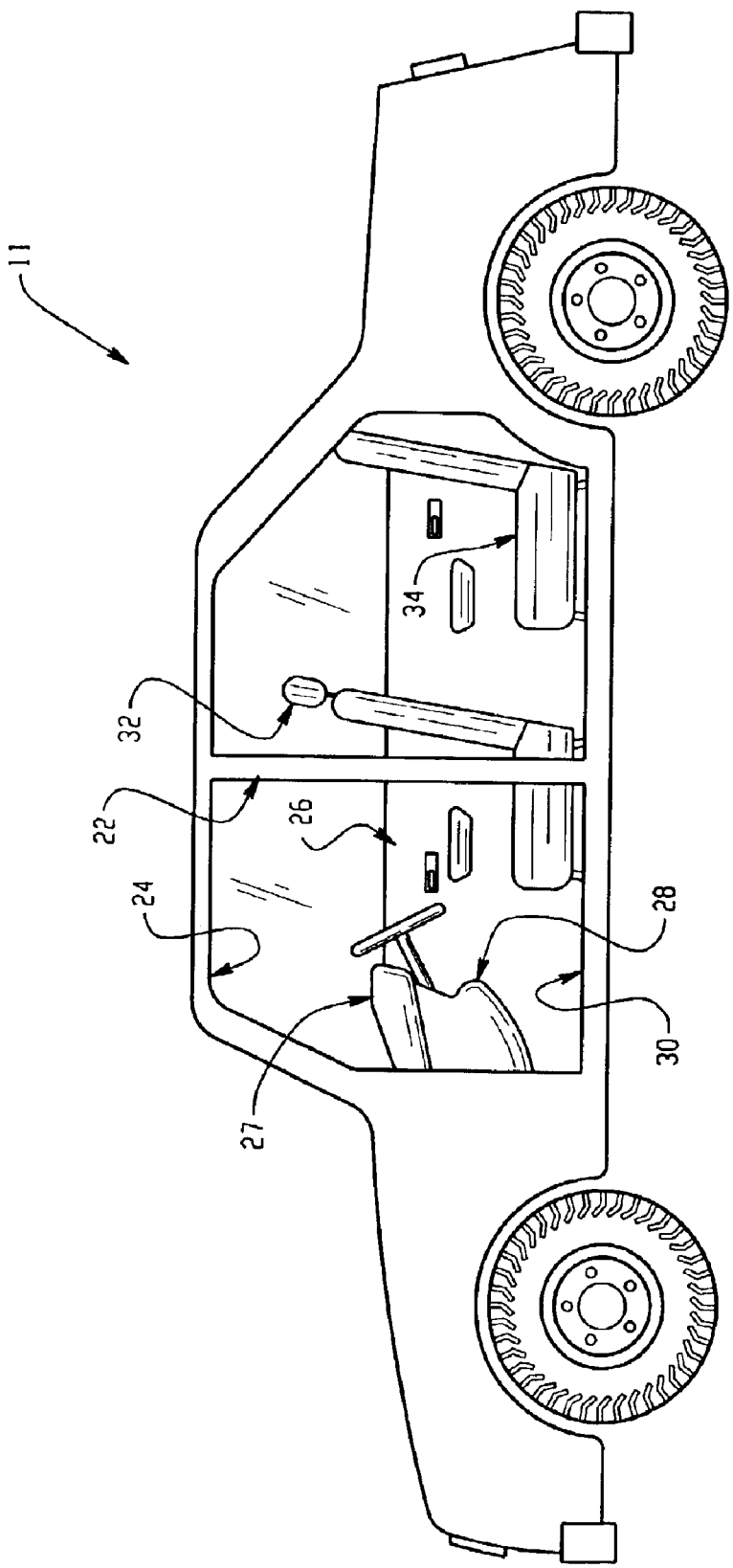
FIG. 3 is a side perspective view of a vehicle illustrating various support structures suitable for employing the energy absorbing assembly.

FIG. 3 illustrate various uses of the energy absorbing assembly 10 in a vehicle environment. The energy absorbing assembly 10 can be used to replace conventional padded interior surfaces in the vehicle 11. For example, the energy absorbing assembly 10 can be used for the door pillars 22, the header 24, the door interiors 26, dashboard 27, the knee bolsters 28, and other areas such as under the carpet on the vehicle floor 30, in the headrest 32 of the seat, the seat 34 itself, or like surfaces where absorption of kinetic energy caused by impact of an object with the surface is desired and/or proper positioning of an occupant is desired during an impact. For example, locating the energy absorbing assembly under the carpet can be used to assist the positioning of an occupant's knees with respect to the knee bolster. In the seat area, the energy absorbing assembly can be strategically positioned to provide stiffening at an edge of the seat 34 to provide anti-submarining properties and help keep an occupant from sliding forward in the event of an impact. Other areas of the vehicle, such as the door pillars, can provide energy absorption properties to the occupant in the event of the impact, thereby decreasing the forces associated with an impact to the occupant.

The covering 12 preferably comprises any flexible and/or detachable material. Preferably, the material chosen for the covering 12 is elastic (flexible) to the limits of the assembly expansion so that it can return to its original geometry upon contraction of the shape memory material 14. Also preferred are materials that can detach from a surrounding surface medium so that once detached, the material, i.e., the detached portion, can provide kinetic energy absorption upon expansion of the shape memory material. Suitable materials for the covering 12 include plastics, fabrics, films, shape memory polymers, and the like. Detachment may be promoted and controlled by structurally weakening the area defining the detached region and the surrounding surface medium, e.g., perforations, seams that promote detachment, and the like.

The shape memory material 14 preferably comprises a material that can be activated to provide expansion and/or detachment of the covering 12. More preferably, the material 14 is chosen to provide expansion and or detachment as well as contraction capabilities. In this manner, the energy absorbing assembly 10 is reversible and repeated use is available. Preferred shape memory materials 14 include shape memory alloys, shape memory polymers, piezoelectrics, and the like.

Shape memory alloys can exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which martensite finishes transforming to martensite is called the martensite finish temperature ($M_f$). Generally, the shape memory alloys are soft and easily deformable in their martensitic phase and are hard, stiff, and/or rigid in the austenitic phase.

Suitable shape memory alloys can exhibit a one-way shape memory effect, an intrinsic two-way effect, or an extrinsic two-way shape memory effect depending on the alloy composition and processing history. In a preferred embodiment, the shape memory alloy chosen for the shape memory material 14 exhibits the intrinsic two-way effect to provide a reversible energy absorbing assembly 10.

Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves as a result of the above noted phase transformations.

Intrinsic two-way shape memory behavior is preferably induced in the shape memory material through processing.

Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles.

Shape memory materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory material 14 with shape memory effects as well as high damping capacity. The inherent high damping capacity of the shape memory alloys can be used to further increase the energy absorbing properties of the energy absorbing assembly.

Suitable shape memory alloy materials for fabricating the shape memory material 14 include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. A preferred shape memory alloy is a nickel-titanium based alloy commercially available under the trademark NITINOL from Shape Memory Applications, Inc.

The shape memory materials formed of shape memory alloys preferably comprise fibers. The fibers may be configured as springs, loops, interconnecting networks, and the like. The fibers may be formed integrally with the support structure, or more preferably, may be attached directly to the support structure 16 and/or the covering 12. For example, an adhesive can be applied (e.g., silver-doped epoxy) to the support structure 16 and/or the covering 12 and the shape memory alloy material 14 can be mechanically pressed into the adhesive. Alternatively, vapor grown shape memory alloy fibers can be deposited directly from a gas phase onto a support structure 16 and/or the covering 12. Preferably, the thickness, length, and overall geometry of the shape memory alloy fiber is suitable for providing an effective length dimension change at sufficient force levels to achieve actuation, i.e., to cause the covering 12 to expand and/or detach from the surrounding surface medium. The shape memory alloy fiber should also be of a thickness, length, and overall geometry effective to provide the desired shape memory effect. The fibers are not intended to be limited to any particular shape.

Other suitable shape memory materials 14 are shape memory polymers. Similar to the behavior of a shape memory alloy, when the temperature is raised through its transition temperature, the shape memory polymer also undergoes a change in shape orientation. To set the permanent shape of the shape memory polymer, the polymer must be at about or above the Tg or melting point of the hard segment of the polymer. "Segment" refers to a block or sequence of polymer forming part of the shape memory polymer. The shape memory polymers are shaped at this temperature with an applied force followed by cooling to set the permanent shape. The temperature necessary to set the permanent shape is preferably between about 100° C. to about 300° C. Setting the temporary shape of the shape memory polymer requires the shape memory polymer material to be brought to a temperature at or above the Tg or transition temperature of the soft segment, but below the Tg or melting point of the hard segment. At the soft segment transition temperature (also termed "first transition temperature"), the temporary shape of the shape memory polymer is set followed by cooling of the shape memory polymer to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

Shape memory polymers may contain more than two transition temperatures. A shape memory polymer composition comprising a hard segment and two soft segments can have three transition temperatures: the highest transition temperature for the hard segment and a transition temperature for each soft segment.

Most shape memory polymers exhibit a "one-way" effect, wherein the shape memory polymer exhibits one permanent shape. Upon heating the shape memory polymer above the first transition temperature, the permanent shape is achieved and the shape will not revert back to the temporary shape without the use of outside forces. As an alternative, some shape memory polymer compositions can be prepared to exhibit a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape in the direction of the first permanent shape or the second permanent shape. Each of the permanent shapes belongs to one component of the shape memory polymer. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape"); and fixing the permanent shape of component B while applying a stress to the component.

Similar to the shape memory alloy materials, the shape memory polymers can be configured in many different forms and shapes. The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., more preferably less than or equal to about 90° C., and most preferably less than or equal to about 70° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbomyl-polyhedral oligomeric silsequioxane), polyvinylchloride, urethane/butadiene copolymers, polyurethane block copolymers, styrene-butadiene-styrene block copolymers, and the like.

The shape memory polymer or the shape memory alloy, may be activated by any suitable means, preferably a means for subjecting the material to a temperature change above, or below, a transition temperature. For example, for elevated temperatures, heat may be supplied using hot gas (e.g. air), steam, hot liquid, or electrical current. The activation means may, for example, be in the form of an iron for supplying heat, a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

The supporting structure 16 may also comprise the activation device for providing the thermal activating signal to shape memory material depending on the particular design of the energy absorbing assembly. For example, the supporting structure 16 may be a resistance type-heating block to provide a thermal energy signal sufficient to cause the shape change.

As previously mentioned, the shape memory material 14 may also comprise a piezoelectric material. Also, in certain embodiments, the piezoelectric material may be configured as the actuator 40 (FIG. 2) for providing rapid deployment. As used herein, the term "piezoelectric" is used to describe a material that mechanically deforms (changes shape) when a voltage potential is applied, or conversely, generates an electrical charge when mechanically deformed. Preferably, a piezoelectric material is disposed on strips of a flexible metal sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as "THUNDER", which is an acronym for THin layer composite UNimorph ferroelectric Driver and sEnsoR. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include, but are not intended to be limited to, inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrenesulfonate) ("PSS"), poly S-119 (poly(vinylamine)backbone azo chromophore), and their derivatives; polyfluorocarbons, including polyvinylidenefluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVC2"), and their derivatives; polyacrylonitriles ("PAN"), and their derivatives; polycarboxylic acids, including poly(methacrylic acid ("PMA"), and their derivatives; polyureas, and their derivatives; polyurethanes ("PUE"), and their derivatives; biopolymermolecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof; and Group VIA and IIB compounds, such as CdSe, CdS, GaAs, AgCaSe 2, ZnSe, GaP, InP, ZnS, and mixtures thereof.

Employing the piezoelectric material will likely need an electrical signal to maintain the energy storage assembly in its relaxed state, i.e., upon being activated the strips will have an arcuate shape. Upon discontinuation of the activation signal, the strips straighten and cause the covering 12 to expand and/or detach.

As previously discussed, the various shapes of the shape memory material 14 employed in the energy absorbing assembly 10 are virtually limitless. Suitable geometrical arrangements may include cellular metal textiles, open cell foam structures, multiple layers of shape memory material similar to "bubble wrap", arrays hooks and/or loops, and the like.

Advantageously, the energy absorbing assembly 10 can be applied to any support structure wherein it is desired to provide a reduction in kinetic energy associated with an object impacting the support structure and/or for proper positioning of an occupant. As such, the system is extremely versatile. Moreover, the use of a mechanical actuator and/or a piezoelectric based actuator in combination with the energy absorbing assembly can be used to provide shorter expansion times. Because of the short expansion times, this type of energy absorbing assembly is particularly well suited for use with crash detection systems using crash detection means plus algorithms to trigger deployment, i.e., systems similar to that used in conventional airbag restraint systems. Restoration of the device to it original geometry would have no such requirement for rapid action and thus could be effectively managed through the action of active materials (shape memory materials) in time frames consistent with resistive heating on the order of seconds not milliseconds.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An energy absorbing assembly, comprising:
   a covering; and
   a shape memory material in operative communication with the covering, wherein the shape memory material has a first shape attached to an underside of the covering and is operative to change to a second shape in response to an activation signal, wherein the shape memory material is adapted to revert back to the first shape upon discontinuation of the activation signal.

2. The energy absorbing assembly of claim 1, wherein the shape memory material comprises a shape memory alloy, a shape memory polymer, or a piezoelectric material.

3. The energy absorbing assembly of claim 1, further comprising a sensor and a controller in operative communication with the shape memory material.

4. The energy absorbing assembly of claim 1, wherein the second shape has a greater length dimension than the first shape and is adapted to cause the covering to expand and/or detach from a surrounding surface medium.

5. The energy absorbing assembly of claim 2, wherein the shape memory alloy comprises nickel-titanium based alloys, indium-titanium based alloys, nickel-aluminum based alloys, nickel-gallium based alloys, copper based alloys, gold-cadmium based alloys, silver-cadmium based alloys, indium-cadmium based alloys, manganese-copper based alloys, iron-platinum based alloys, or iron-palladium based alloys.

6. The energy absorbing assembly of claim 2, wherein the shape memory polymer comprises polyphosphazenes, poly (vinyl alcohols), polyamides, polyester amides, poly(amino acids), polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, or copolymers thereof.

7. The energy absorbing assembly of claim 1, wherein the shape memory material comprises an actuator strip and a piezoelectric material disposed on portions of the actuator strip, wherein the piezoelectric material comprises platinum, palladium, nickel, titanium, chromium, iron, gold, silver, copper, cadmium, selenium, silicon, Group VIA and IIB compounds, metal oxides, metal alloys, and mixtures thereof.

8. The energy absorbing assembly of claim 1, further comprising a mechanical actuator in operative communication with the energy absorbing assembly, wherein the mechanical actuator is adapted to expand the covering and the shape memory material.

9. The energy absorbing assembly of claim 8, wherein the mechanical actuator comprises a pyrotechnic device, a piezoelectric device, or an accumulator inflator.

10. The energy absorbing assembly of claim 1, wherein the covering is flexible.

11. An interior vehicle surface comprising: an energy absorbing assembly comprising a covering and a shape memory material in operative communication with the covering, wherein the shape memory material has a first shape attached to an underside of the covering and is adapted to expand to a second shape in response to an activation signal, wherein the second shape has a greater length dimension than the first shape and causes the covering to expand, wherein the shape memory material is adapted to revert back to the first shape upon discontinuation of the activation signal.

12. The interior vehicle surface of claim 11, wherein the energy absorbing assembly forms a door pillar surface, a headrest surface, a floor surface, a seat surface, a dashboard surface, a steering wheel surface, a door surface, a ceiling surface, or a combination comprising at least one of the foregoing interior vehicle surfaces.

13. The interior vehicle surface of claim 11, wherein the shape memory material comprises a shape memory alloy, a shape memory polymer, or a piezoelectric material.

14. The interior vehicle surface of claim 11, further comprising a mechanical actuator in fluid communication with an interior region formed by the covering and a support structure to which the energy absorbing assembly is attached, wherein the mechanical actuator is adapted to inflate the interior region and expand the flexible covering.

15. The interior vehicle surface of claim 14, wherein the mechanical actuator comprises a pyrotechnic device, a piezoelectric device, or an accumulator inflator.

16. A vehicle component, comprising:

a support structure;

and an energy absorbing assembly attached to the support structure, wherein the energy absorbing assembly comprises a shape memory material in operative communication with a covering, wherein the shape memory material has a first shape attached to an underside of the covering and is operative to change to a second shape in response to an activation signal and revert back to the first shape upon discontinuation of the activation signal.

17. The vehicle component of claim 16, further comprising a sensor in operative communication with the energy absorbing assembly, wherein the sensor is adapted to transmit sensor signals indicative of at least one vehicle condition; a controller operatively connected to the sensor and adapted to receive the sensor signals; and an activation device operatively connected to the controller, wherein the controller is programmed and configured to cause the activation device to provide an activation signal to the shape memory material when the sensor signals indicate a predetermined vehicle condition.

18. The vehicle component of claim 16, wherein the shape memory material comprises a shape memory alloy, a shape memory polymer, or a piezoelectric material.

19. The vehicle component of claim 16, further comprising a mechanical actuator operatively connected to the cover to selectively inflate the cover to an inflated position from a stowed position, wherein the shape memory material is in a first shape when the cover is in the stowed position and a second shape when the cover is in the inflated position, and wherein the shape memory material is sufficiently connected to the cover to retract the cover to the stowed position after receiving the activation signal.

20. A method of operating an energy absorbing assembly, comprising attaching the energy absorbing assembly to a support structure, wherein the energy absorbing assembly comprises a cover and a shape memory material disposed between the support structure and the cover; sensing an impact of an object; providing an activation signal to the shape memory material to cause the cover to expand or expand and detach from a surrounding surface medium, wherein the covering and the expanded shape memory material are adapted to absorb a kinetic energy of the object; and discontinuing the activation signal to revert the shape memory material and cover back to an original position.

21. The method of operating the energy absorbing assembly of claim 20, wherein the activation signal comprises a heat signal, an electrical signal, a pneumatic signal, a mechanical activation signal, and combinations comprising at least one of the foregoing signals.

22. The method of operating the energy absorbing assembly of claim 20, wherein the shape memory material comprises a shape memory alloy, a shape memory polymer, or a piezoelectric material.

23. The method of operating the energy absorbing assembly of claim 20, wherein sensing the impact and providing the first and second activation signal is repeated.

24. A method of operating an energy absorbing assembly, comprising: attaching the energy absorbing assembly to a support structure, wherein the energy absorbing assembly comprises a cover, a shape memory material disposed between the support structure and the cover, and an actuator;

sensing an impact of an object; providing a first activation signal to the actuator and causing the shape memory material and cover to expand or expand and detach from the support structure, wherein the cover and the shape memory material are adapted to absorb a kinetic energy of the object; and providing a second activation signal to the shape memory material to cause the shape memory material and cover to return to its original position.

25. The method of operating the energy absorbing assembly of claim 24, wherein causing the shape memory material and cover to expand or expand and detach from the support structure comprises inflating cover with a pyrotechnic device or an accumulator.

26. The method of operating the energy absorbing assembly of claim 24, wherein causing the shape memory material and cover to expand or expand and detach from the support structure comprises activating a piezoelectric device with an electrical signal.

27. The method of operating the energy absorbing assembly of claim 24, wherein sensing the impact and providing the first and second activation signal is repeated.

* * * * *